United States Patent
Jiang et al.

(10) Patent No.: US 11,531,802 B2
(45) Date of Patent: Dec. 20, 2022

(54) LAYOUT CONTEXT-BASED CELL TIMING CHARACTERIZATION

(71) Applicant: TAIWAN SEMICONDUCTOR MANUFACTURING COMPANY LTD., Hsinchu (TW)

(72) Inventors: Zhe-Wei Jiang, Hsinchu (TW); Jerry Chang Jui Kao, Taipei (TW); Sung-Yen Yeh, Pingtung County (TW); Li Chung Hsu, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 586 days.

(21) Appl. No.: 16/657,488

(22) Filed: Oct. 18, 2019

(65) Prior Publication Data

US 2021/0117603 A1 Apr. 22, 2021

(51) Int. Cl.
*G06F 30/392* (2020.01)
*G06F 30/398* (2020.01)
*G06N 3/08* (2006.01)
*G06N 3/063* (2006.01)
*G06F 30/373* (2020.01)

(52) U.S. Cl.
CPC .......... *G06F 30/392* (2020.01); *G06F 30/373* (2020.01); *G06F 30/398* (2020.01); *G06N 3/0635* (2013.01); *G06N 3/08* (2013.01)

(58) Field of Classification Search
CPC .............................. G06F 30/392; G05F 30/398
USPC ............................................................. 703/4
See application file for complete search history.

(56) References Cited

U.S. PATENT DOCUMENTS

| | | | | |
|---|---|---|---|---|
| 11,068,637 | B1 * | 7/2021 | Hsu ..................... | G06F 30/367 |
| 2004/0133369 | A1 * | 7/2004 | Pack .................... | G03F 1/84 |
| | | | | 716/52 |
| 2018/0210421 | A1 * | 7/2018 | Kim ..................... | G06F 30/392 |

OTHER PUBLICATIONS

Mark Zwolinski, "Electrical Variability due to Layout Dependent Effects: Analysis, Quantification, and Mitigation on 40 and 28nm SOC Designs," appeared as http://www.ispd.cc/slides/2013/7_zwolinski.pdf, Aug. 29, 2017.

* cited by examiner

*Primary Examiner* — Suchin Parihar
(74) *Attorney, Agent, or Firm* — WPAT; Anthony King

(57) ABSTRACT

A method performed by at least one processor includes the following steps. A layout of an integrated circuit (IC) is accessed, wherein the layout has at least one cell. A context group for the cell is determined based on a layout context of the cell, wherein the context group is associated with a timing table. A timing analysis is performed on the layout to determine whether the layout complies with a timing constraint rule according to the timing table. A system including one or more processors including instructions for implementing the method and a non-transitory computer readable storage medium including instructions for implementing the method are also provided.

20 Claims, 14 Drawing Sheets

LAYOUT CONTEXT-BASED CELL TIMING CHARACTERIZATION

BACKGROUND

In advanced semiconductor technologies, continuing reduction in device size and increasingly complex circuit arrangements have made the design and fabrication of integrated circuits (ICs) more challenging and costly. In the flow of modern circuit design methodology, the designed circuit must be tested to confirm it meets the design specification and manufacturing criteria before it is delivered for mass production. Such confirmation of millions of transistor devices is difficult, if not impossible, to accomplish manually in an efficient and precise manner. Electronic Design Automation (EDA) tools have been introduced to aid in designing and troubleshooting the electronic circuits to increase design efficiency and reduce design errors. Moreover, various design libraries are provided to reduce the effort of building commonly used functional blocks in the circuit. However, although the EDA tools have progressed significantly, they are still not satisfactory in many aspects. For example, the libraries usually provide parameters with larger margins than necessary in order to accommodate as many interconnection conditions as possible and ensure that the manufactured circuit fabricated based on the libraries functions correctly. As a result, the circuit may be fabricated with suboptimal efficiency in power, area or performance. Therefore, there is a need to improve the EDA-aided design flow to reduce unnecessary design margins while maintaining the circuit performance.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
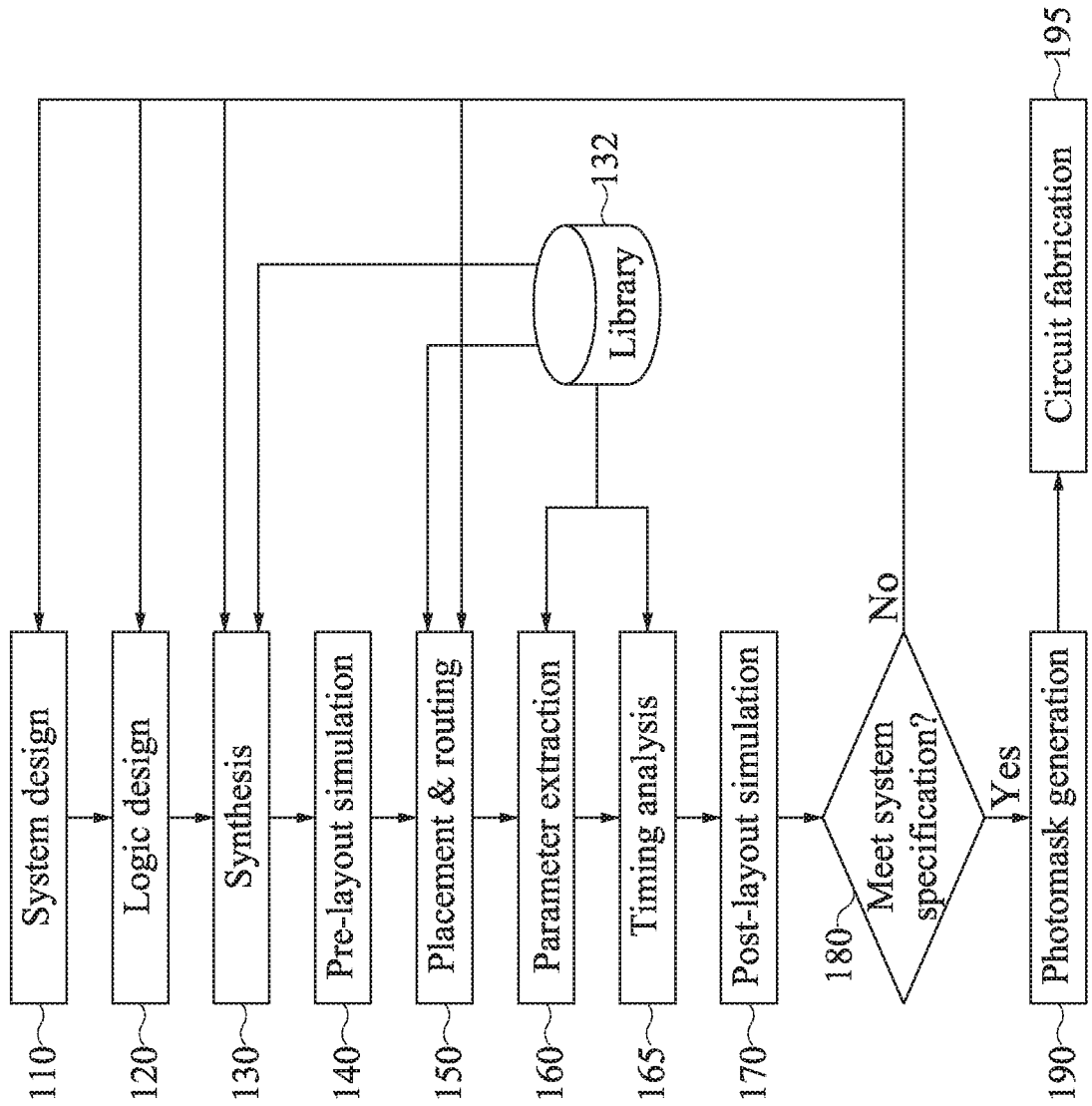
FIG. 1 is a schematic diagram illustrating a design flow of an integrated circuit (IC), in accordance with some embodiments of the present disclosure.

In the following detailed description, numerous specific details are set forth in order to provide a thorough understanding of the present disclosure. However, it will be understood by those skilled in the art that the present disclosure may be practiced without these specific details. In other instances, well-known methods, procedures, components and circuits are not described in detail so as not to obscure the present disclosure.

Further, the present disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Throughout the present disclosure, the term "active region" refers to a planar area of a surface of a semiconductor device in (or over) which the major components of a semiconductor transistor are formed. The active region may be used to define the area where the gate or the source/drain region of a transistor device is formed. Alternatively, some other terms, such as "oxide diffusion (OD) region," "oxide definition (OD) area" and "active area," may be used to refer to the active region. The active region may be formed in various shapes from a top-view perspective, such as a rectangular shape, and may be sometimes referred to as an "OD strip." In some embodiments, the active region is laterally surrounded by a dielectric material, and thus the boundary of the active region is defined thereby. The active region may include doped or undoped portions.

The present disclosure discusses a cell library characterization framework for determining and providing the timing parameters of a cell in the design stage of manufacturing semiconductor ICs. When a synthesis operation is used for implementing a circuit design, e.g., a circuit layout or simply a layout, cell libraries are usually involved to support silicon-proven circuits of commonly used functional blocks for facilitating the design process. The cell libraries may include a variety of standard cells with associated parameters characterizing the electrical or geometrical characteristics of the cells from a quantitative perspective and serving as the cell profiles. Among the various cell parameters, the timing or delay parameters play a crucial role for ensuing proper functioning of the circuit. For example, the timing parameters associated with a pin of the cells, such as rise delay, fall delay or other transitional delays, affect the performance and stability of signal sampling or signal transmission in which the cell is involved.

The timing parameters of a pin in a cell are provided in a timing table or delay table for reflecting the actual time periods used by the pin in a fabricated chip. These timing parameters are dependent upon the detailed design of the cell and thus are usually predetermined and provided by the cell designer, e.g., a third-party library provider. The actual time delays associated with the pin are further affected by the topology of the circuit in the vicinity of the cell, or the circuit coupled to the cell; such effect is referred to as the layout-dependent effect. The layout-dependent circuit topology in the vicinity of a cell, or in the circuit features coupled to a cell, is collectively referred to as a context of a cell throughout the present disclosure. When more than one cell of the same type is used in the layout, the individual cells may be referred to as different cell instances of that cell type throughout the present disclosure.

To address the issue of the layout-dependent effect of a cell, the library provider may assign more than one set of candidate timing tables in the absence of information on the layout context, e.g., timing tables that cover fastest and slowest time delay conditions for a pin. The EDA tool may be executed to run multiple rounds of timing analysis tasks based on the candidate timing table in each round. However, the design layout is usually required to pass the timing verifications under at least two timing tables providing the fastest and slowest delay conditions, and the fastest (or slowest) delay condition equally applies to all cell instances in different locations of the layout without considering the layout contexts of individual cell instances. As a result, the timing parameters provided for a specific cell instance may be overly conservative or aggressive. A waste of area or power may occur due to the overly conservative timing parameters, and reengineering may be needed to modify the overly aggressive timing parameters. The chip performance is thus limited.

In the present disclosure, an improved cell timing characterization method and a system for implementing the method are proposed. The proposed cell timing characterization is mainly comprised of two phases, i.e., a training phase and a recognition phase. During the training phase, a training model or classification model is built with the model-specific parameters for classifying a variety of contexts of a cell into different groups. The parameters may be trained for extracting the correlation between the timing delays and the layout-dependent effects for each group. For example, the training model may take into account information of the layout features, e.g., the oxide diffusion (OD) regions, or equivalently, active regions, around the cell. A well-trained model can be leveraged in the recognition phase, during which a cell instance along with its context is classified by the training model into a suitable group and assigned a timing table associated with the group. Therefore, the proposed cell timing characterization method implements a context-aware timing parameter characterization framework that can determine different timing tables for a cell instance by taking into account different layout contexts, and thus matches the actual time delay values better than the predetermined timing tables. As a result, the estimated timing delays can aid in improving the estimate of timing delays of the pins in different cell instances and reducing the likelihood of needing to reengineer the circuit due to the broad ranges of the delay values provided by the timing tables. In addition, the burden of generating a long list of timing tables for dealing with the layout-dependent effect is significantly reduced.

FIG. 1 is a schematic diagram illustrating a design flow 10 of a semiconductor integrated circuit (IC), in accordance with some embodiments. The design flow 10, employed for designing semiconductor ICs or chips, utilizes one or more electronic design automation (EDA) tools to perform operations therein. A standalone computing device or a computing cluster, such as a workstation, a personal computer or a group thereof, is typically used in executing the method of the design flow 10. The design flow 10 includes a system design stage 110, a logic design stage 120, a synthesis stage 130, a pre-layout simulation stage 140, a placement and routing development stage 150, a parameter extraction stage 160, a timing analysis stage 165, a post-layout simulation stage 170, a photomask generation stage 190 and a circuit fabrication stage 195.

Initially, at the system design stage 110, a systematic architecture for the chip of interest is provided with a high-level description. During stage 110, the chip functions along with performance requirements are determined according to a design specification. The chip functions are usually represented by respective schematic functional modules or blocks. In addition, an optimization or performance trade-off may be sought to achieve the design specification at acceptable levels of cost and power.

At the logic design stage 120, the functional modules or blocks are described in a register transfer level (RTL) using a hardware description language. Commercially available language tools are generally used, such as Verilog or VHDL.

In an embodiment, a preliminary functionality check is performed during stage 120 to verify if the implemented functions conform to the specification set forth in stage 110. In some embodiments, a timing verification is performed to determine if the RTL-level circuit design complies with the specification.

Subsequently, at the synthesis stage 130, the modules in the RTL descriptions are converted into an instance of design data, e.g., netlist data, where the circuit structure, e.g., logic gates and registers, of each function module are established. In an embodiment, a library 132, e.g., a standard cell library, is provided to supply different classes of low-level circuits, i.e., standard cells, serving specific Boolean logic or sequential logic functions. In some embodiments, technology mapping of logic gates and registers to available cells in the standard cell libraries are conducted. Further, the design data or netlist data is provided to describe the functional relationship of the chip at a gate level. The library 132 may be provided by an IC designer, an IC manufacturing company, an EDA tool provider or any relevant third party. The library 132 also provides the parameters associated with each cell, such as the timing delays, powers, voltages, and the like. In an embodiment, the netlist data is transformed from the gate-level view to a transistor-level view. In an embodiment, when the library is provided or updated (as will be described in subsequent paragraphs herein) and incorporated into the EDA tool, the IC designer can identify violations of the design rule (e.g., timing violations) and revise the original netlist data in response to the identified violations.

Subsequently, the gate-level netlist data is verified at the pre-layout simulation stage 140. During the verification process of stage 140, if some functions fail the verification in the simulation, the design flow 10 may be paused temporarily or may go back to stage 110 or 120 for further modification. After the pre-layout simulation stage 140, the chip design has passed a preliminary verification and the front-end design process is completed. Next, a backend physical design process is conducted. In some embodiments, a timing verification is also performed to determine if the synthesized netlist data complies with the specification.

During the placement and routing stage 150, a physical architecture representing the chip, determined during the front-end process, is implemented. Although not stated expressly, the layout development may include a floorplan stage in the beginning of or prior to the placement and routing stage 150, in which the floorplan stage is used for allotting spaces for major functional blocks in a two-dimensional circuit plane. Subsequently, the layout development involves a placement operation and a routing operation in sequence. Detailed structures and associated geometries for the components of the major blocks in the floorplan stage are determined in the placement operation. Interconnects among different components are routed subsequent to the placement operation. Both placement and routing operations are performed to meet the requirement of a design rule check (DRC) deck so that the manufacturing constraints of the chip are fulfilled. In an embodiment, a clock tree synthesis operation is performed at the placement and routing stage for a digital circuit in which clock generators and circuits are incorporated into the design. In an embodiment, a timing analysis or verification operation is performed to determine whether the tentative circuit arrangements meet the design specification, and a post-routing operation is performed subsequent to the preliminary routing operation in order to resolve timing issues discovered during the timing verification operation. Once the placement and routing stage 150 is completed, a placed-and-routed layout is created and a netlist along with data on placement and routing is generated accordingly.

During the parameter extraction stage 160, a layout parameter extraction (LPE) operation is conducted to derive layout-dependent parameters, such as parasitic resistance and capacitance, based on the layout developed in the placement and routing stage 150. Subsequently, a post-layout netlist data, which includes the layout-dependent parameters, is generated.

Subsequently, timing analysis or timing verification is performed at a timing analysis stage 165. The timing verification performed in stage 165 may take into account the layout-dependent parameters extracted in stage 160, and better reflect the circuit behavior under the effects of parasitic resistance and capacitance. The library 132 may be involved in the timing analysis operation of stage 165.

During the post-layout simulation stage 170, a physical verification is performed, taking into consideration the parameters acquired in previous stages. A simulation of transistor-level behavior is conducted to examine whether the chip performance derived by the post-layout netlist meets the system specifications. In some embodiments, the post-layout simulation is performed to minimize probability of electrical issues or layout difficulties during the chip manufacturing process. In an embodiment, the library 132 is provided not only for stage 130, but also for stages 140, 150, 160, 165, and 170 so that the electrical or geometric parameters of cells and other features listed in the library 132 can be leveraged to emulate the real-world performance of the circuits throughout the design flow 10.

Next, in stage 180, it is determined whether the post-layout netlist meets the design specifications. If the result of the post-layout simulation is unfavorable, the design flow 10 loops back to previous stages for tuning functionalities or structures. For example, the design flow 10 may loop back to stage 150 where the layout is re-developed to resolve issues from a physical perspective. Alternatively, the design flow 10 may retreat to an earlier stage 110 or 120 to recast the chip design from a functional level in case the problems cannot be resolved within the back-end process.

If the post-layout netlist passes the verification, the circuit design is accepted and then signed off accordingly. The chip is manufactured according to the accepted post-layout netlist. In an embodiment, during stage 190, at least one photomask is generated based on the verified post-layout netlist in stage 170. A photomask is a patterned mask used to allow a portion of light to pass through or reflect off the photomask while blocking or absorbing other portions of the light in order to form a pattern of features on a light-sensitive layer, e.g., a photoresist layer, on a wafer. The photomask is used to transfer the patterns of the verified post-layout netlist onto wafers. In some embodiments, a multi-layer layout netlist may require a set of photomasks in which the feature pattern in each layer is established in the corresponding photomask. As a result, the patterns of the layout netlist formed on the photomasks are transferred to the light-sensitive layer through an exposure operation.

During stage 195, the circuit is fabricated on the wafer using the patterns on the photomasks generated in stage 190. The fabrication may involve known semiconductor manufacturing operations, such as lithography, etching, ion implantation, deposition, and thermal operations. In some embodiments, a testing operation may be utilized in an intermediate or final phase of stage 195 to ensure physical and functional integrity of the fabricated circuit. In some embodiments, a singulation operation may be used to separate the circuit wafer into individual circuit dies. The fabrication of the circuit is thus completed.

The design flow 10 illustrated in FIG. 1 is exemplary. Modifications to the above-mentioned stages, such as changes of order of the stages, partition of the stages, and deletion or addition of stages, are within the contemplated scope of the present disclosure.

Figure 2:
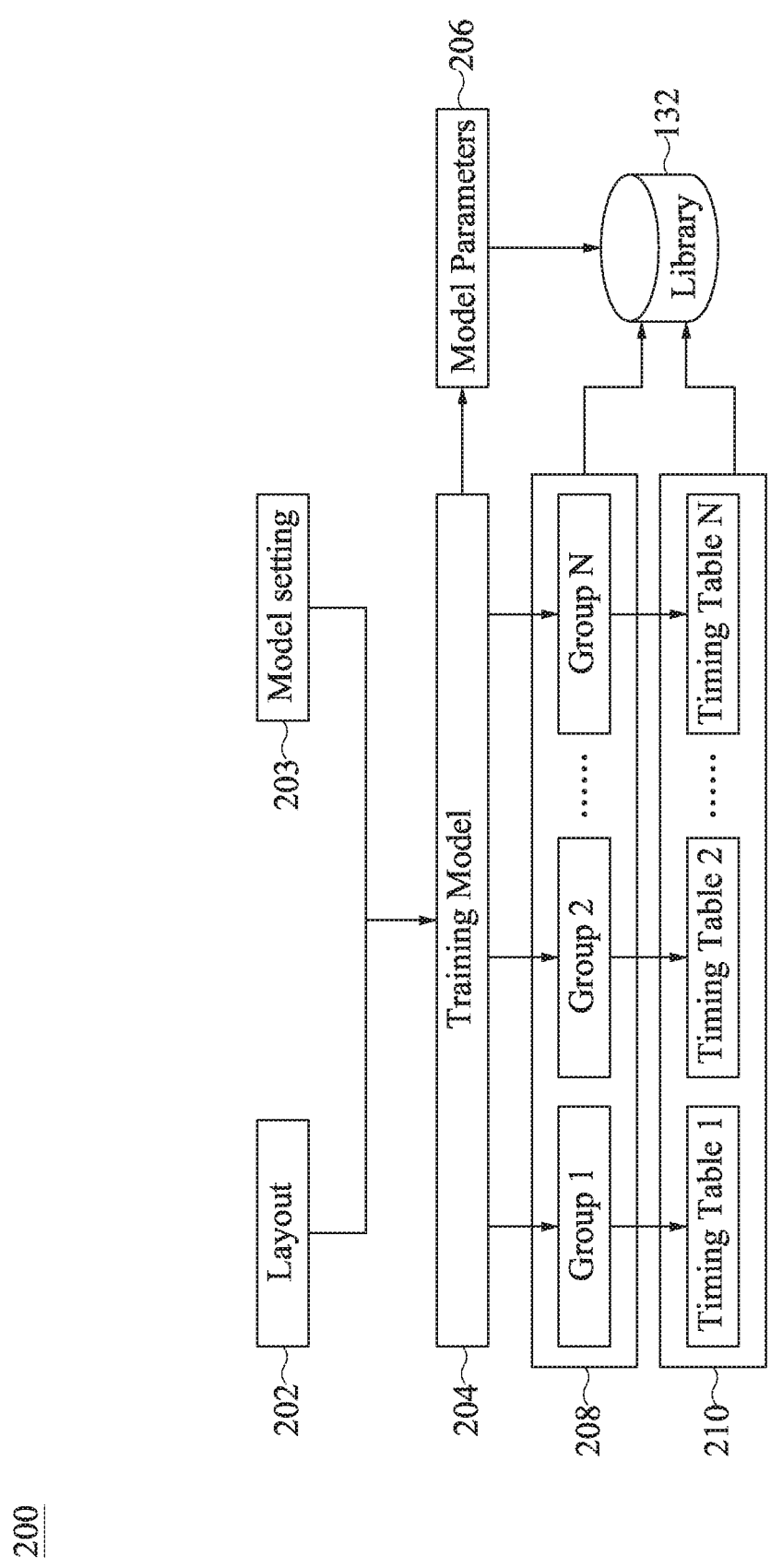
FIG. 2 is a schematic diagram of a context grouping process, in accordance with some embodiments of the present disclosure.

FIG. 2 is a schematic diagram of a context grouping process 200, in accordance with some embodiments of the present disclosure. The context grouping process 200 is used to provide classified groups of a target cell based on their layout contexts. When the context grouping process 200 begins, at least one layout 202 is accessed or generated that includes at least one cell instance Ci. The layout 202 may be historical layout data generated at different stages of the backend phase, such as stage 150, 160, 165, 190 or 195 with different level of completeness. In some embodiments, the layout 202 is formed of a plurality of layouts where the layout contexts in the vicinity of the cells are determined. For example, the layout context for the cell instance Ci comprises interconnections of resistors, capacitors, inductors, metal lines, and the layout context may be formed of features, such as oxide diffusion (OD) regions (or active regions), gate regions, dielectric regions, doping regions and conductive regions, that are adjacent to the cell instance Ci. In some embodiments, a context zone defining the boundaries of a layout context for a cell instance is predetermined, and only the circuit features of the layout that overlaps the context zone are considered as the content of the context. In some embodiments, the context zone has a circular shape, a polygonal shape such as a rectangular shape, or other suitable shape.

In some embodiments, a simulation is performed to measure or simulate the timing delays of the individual cell instances in the layout of interest. The simulation is conducted across an entire layout or a partition of the layout by taking into account the context information of each cell instance. The simulated timing delays of the cell instances are different according to different cell contexts and may be used as the timing delays of the respective cell instances in a timing analysis or timing verification operation.

A training model 204 is provided to classify the historical or pre-determined contexts of the cell instance Ci in the layout data 202 into different groups through the context grouping process 200 based on a model setting 203. In some embodiments, abstracted information of the layout 202, such as complied parameters of the layout 202, is fed into the training model 204. In some embodiments, the circuit topology in the vicinity of a cell may be transformed into one or more vicinity images and the vicinity images are fed into the training model 204. In some embodiments, all cell instances Ci's of the same cell type are identified by the training model 204. Further, the layout contexts including the circuits around the identified cell instances Ci's are extracted and fed into the training model 204.

The training model 204 is configured to conduct context grouping under an artificial intelligence or machine learning framework. The training model 204 is defined by a model structure and the accompanying model setting 203. In some embodiments, the model setting 203 may include the model type, the hierarchy of the models including the layers, nodes, interconnections and learning algorithms, the number of groups N with N being an integer, and the set of timing (delay) tables for each of the groups. The model type of the training model 204 may be an artificial neural network including, but not limited to, convolutional neural network (CNN), recurrent neural network (RNN), autoencoder, and the like. In some embodiments, the training model 204 is constructed by LeNet, AlexNet, VGG, GoogLeNet, ResNet, and the like. In some embodiments, the model setting 203 further includes, but is not limited to, the number of layers for the training model 204, the node number of each layer, and the weight values of edges interconnecting the nodes. In some embodiments, the model training process is performed using an unsupervised learning approach.

The training model 204 is trained by the layout information of the layout 202, specifically the circuit topology information, or context, of the cell instance Ci. The context for the cell instance Ci may include active regions (or equivalently OD strips), gate regions, dielectric regions, doping regions and conductive regions, in which the shapes, orientations and distances of the aforesaid regions may affect the timing delays of the pins of the cell instance Ci. In some other embodiments, the context for the cell instance Ci includes resistors, capacitors, inductors and metal lines that affect the response time or transmission time of a signal. The configurations, geometries and materials of these features may determine the electrical properties, such as capacitance, inductance and resistance seen or experienced by the cell instance Ci from a pin of the cell instance Ci.

Figure 3A:
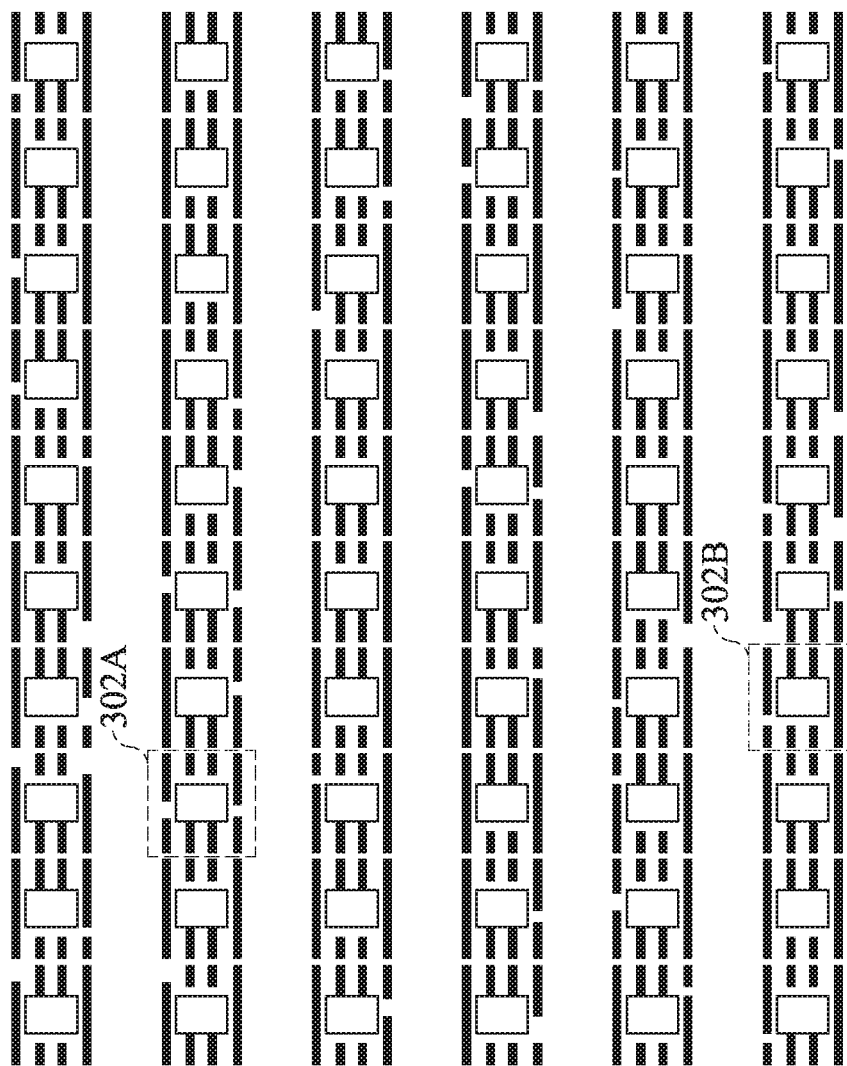
FIG. 3A is an exemplary layout, in accordance with some embodiments of the present disclosure.

FIG. 3A is an exemplary layout 202, in accordance with some embodiments of the present disclosure. In the depicted embodiment, the layout 202 includes at least six cell rows extending horizontally, in which the cell rows may have the same or different row heights. In addition, each cell row includes cells (e.g., ten cells in the depicted embodiment) spaced apart from one another by a predetermined distance. Each cell row of the layout 202 further includes active regions (also referred to as OD strips) extending horizontally. In the depicted embodiment, each cell row includes a top active region strip extending over the cells, a bottom active region strip extending below the cells, and two middle active region rows across the cells. It should be noted, however, that although the general configurations of the cells with respect to the active region strips look similar in FIG. 3A, the detailed abutting conditions of each cell with its neighboring active region strips may vary. The subtle differences of the contexts among different cell instances lead to the variation of timing delays. In the proposed framework, cell instances with the same cell type are identified, collected and treated individually. For example, exemplary cell instances 302A and 302B are identified that serve as two instances of cell 302 in the layout 202. The number and the configurations of the active region strips in FIG. 3A are shown for illustrative purposes only. Other configurations are also within the contemplated scope of the present disclosure.

Figure 3B:
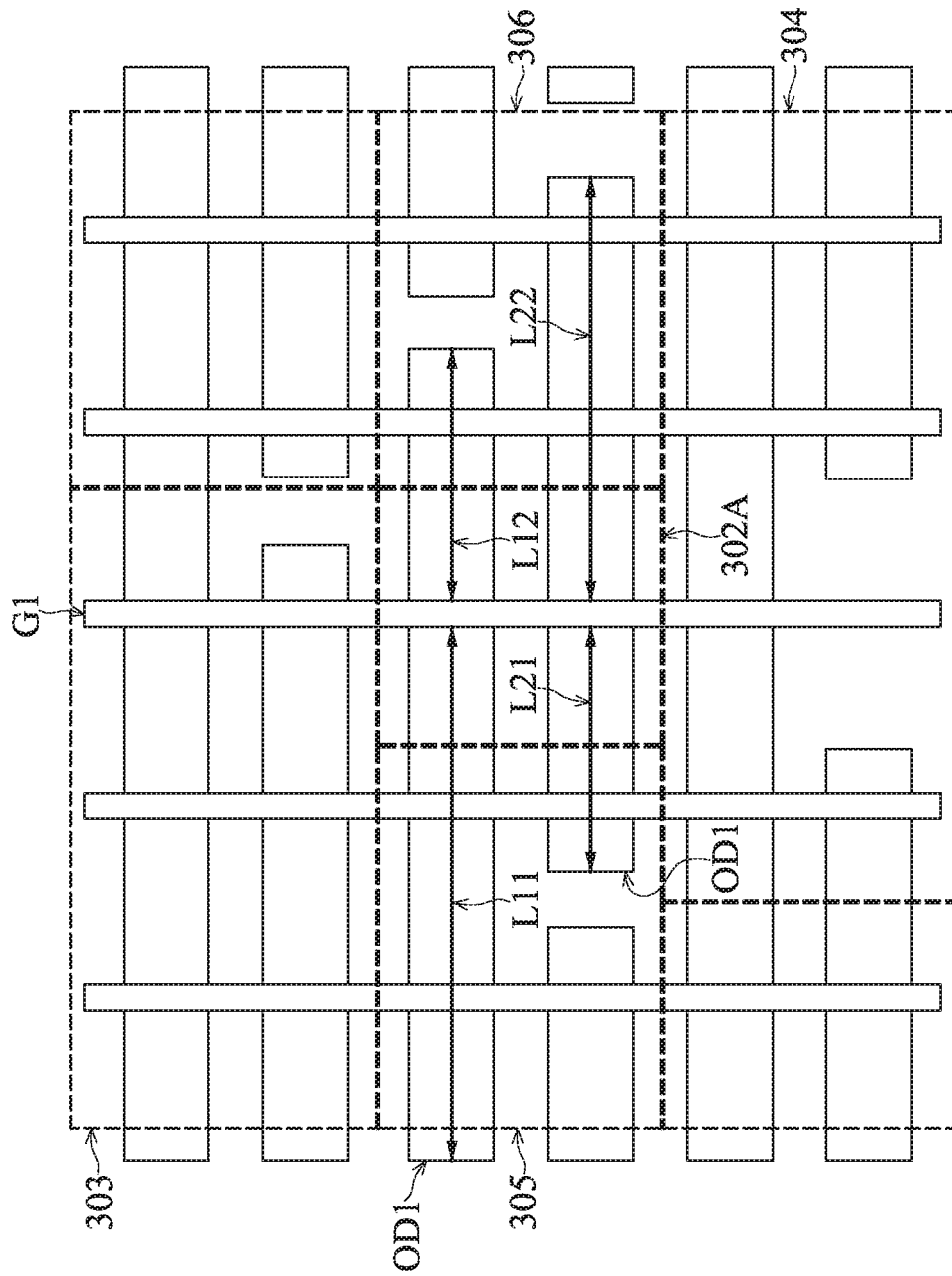
FIGS. 3B to 3E are various exemplary layout contexts of a cell, in accordance with some embodiments of the present disclosure.

FIGS. 3B to 3E are various exemplary layouts contexts of a cell, in accordance with some embodiments of the present disclosure. Referring to FIG. 3B, a layout 310 comprising six active region strips and six gate strips is formed by several cells abutting one another. A cell 302A is located at the center of the layout 310, and other cells, such as cells 303, 304, 305 and 306, are disposed to surround the cell 302A. The aforesaid cells are arranged to implement a plurality of parallel gate strips and parallel active region strips of the layout 310. The parallel gate strips may extend in a direction different from the direction in which the parallel active region strips extend. In some embodiments, the gate strips are substantially perpendicular to the active region strips. Each of the cells 303, 302A and 304 includes a first portion, a second portion and a third portion of a gate strip G1, respectively, in which the three portions constitute a contiguous gate strip across the boundaries of the cells 302A, 303 and 304. Further, some cells in the layout 310 include a respective portion of an active region strip, e.g., each of the cells 305, 302A and 306 includes respective portions of an active region strip OD1 or OD2 and these portions constitute a contiguous active region strip across the boundaries of the cells 305, 302A and 306.

In some embodiments, the dimensions and locations of the active region strips around the cell 302A affect the timing delay characteristics of the cell 302A. For example, lengths L11 and L12 of the active region strip OD1 are included in the parameters of the context of the cell 302A, in which the length L11 is measured from a left boundary side of the active region strip OD1 to the gate strip G1 and the length L12 is measured from a right boundary side of the active region strip OD1 to the gate strip G1. Similarly, lengths L21 and L22 of the active region strip OD2 are considered as parameters of the context of the cell 302A, in which the length L21 is measured from a left boundary side of the active region strip OD2 to the gate strip G1 and the length L22 is measured from a boundary right side of the active region strip OD2 to the gate strip G1.

Figure 3C:
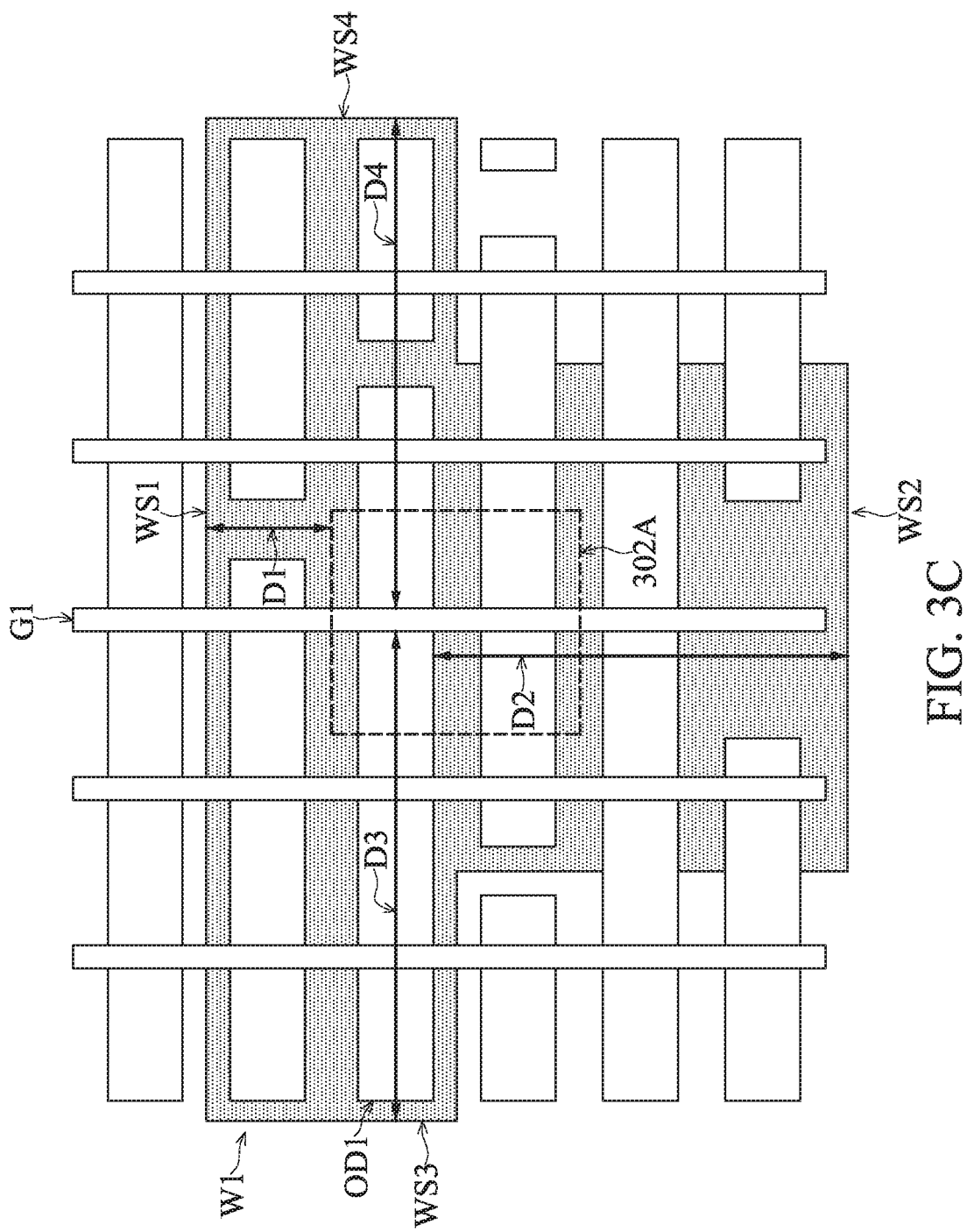

Referring to FIG. 3C, a layout 320 is formed of several cells including the cell 302A located at the center of the layout 320. The configurations of the constituent cells arranged to implement the gate strips and active region strips are similar to those in FIG. 3B and, for simplicity, are not separately illustrated in FIG. 3C. In some embodiments, the layout 320 further includes a well region W1 overlapping at least some of the gate strips or active region strips. The well region W1 may be also an implantation region or a doping region. The well region W1 may be formed across several cells, such as cells 303, 305, 306 and 304. In the depicted embodiment, the well region W1 has an area greater than the area of the cell 302A and overlaps the entire cell 302A. In some embodiments, the well region W1 is arranged in a layer of the cell 302A same as or different from the layer of the cell 302A in which the gate strips or the active region strips reside.

In some embodiments, the dimensions and locations of the well region W1 around the cell 302A affect the timing delay characteristics of the cell 302A. For example, distances between the boundary of the well region W1 and the features in the cell 302A are included as parameters for a context-aware timing calculation framework. To be specific, distances D1 and D2 are included as parameters of the context of the cell 302A, in which the distance D1 is measured from an upper boundary side WS1 of the well region W1 to the active region strip OD1 in the cell 302A and the distance D2 is measured from a lower boundary side WS2 of the well region W1 to the active region strip OD1. Similarly, distances D3 and D4 are included as parameters of the context of the cell 302A, in which the distance D3 is measured from a left boundary side WS3 of the well region W1 to the gate strip G1 in the cell 302A, and the distance D4 is measured from a right boundary side WS4 of the well region W1 to the gate strip G1.

Figure 3D:
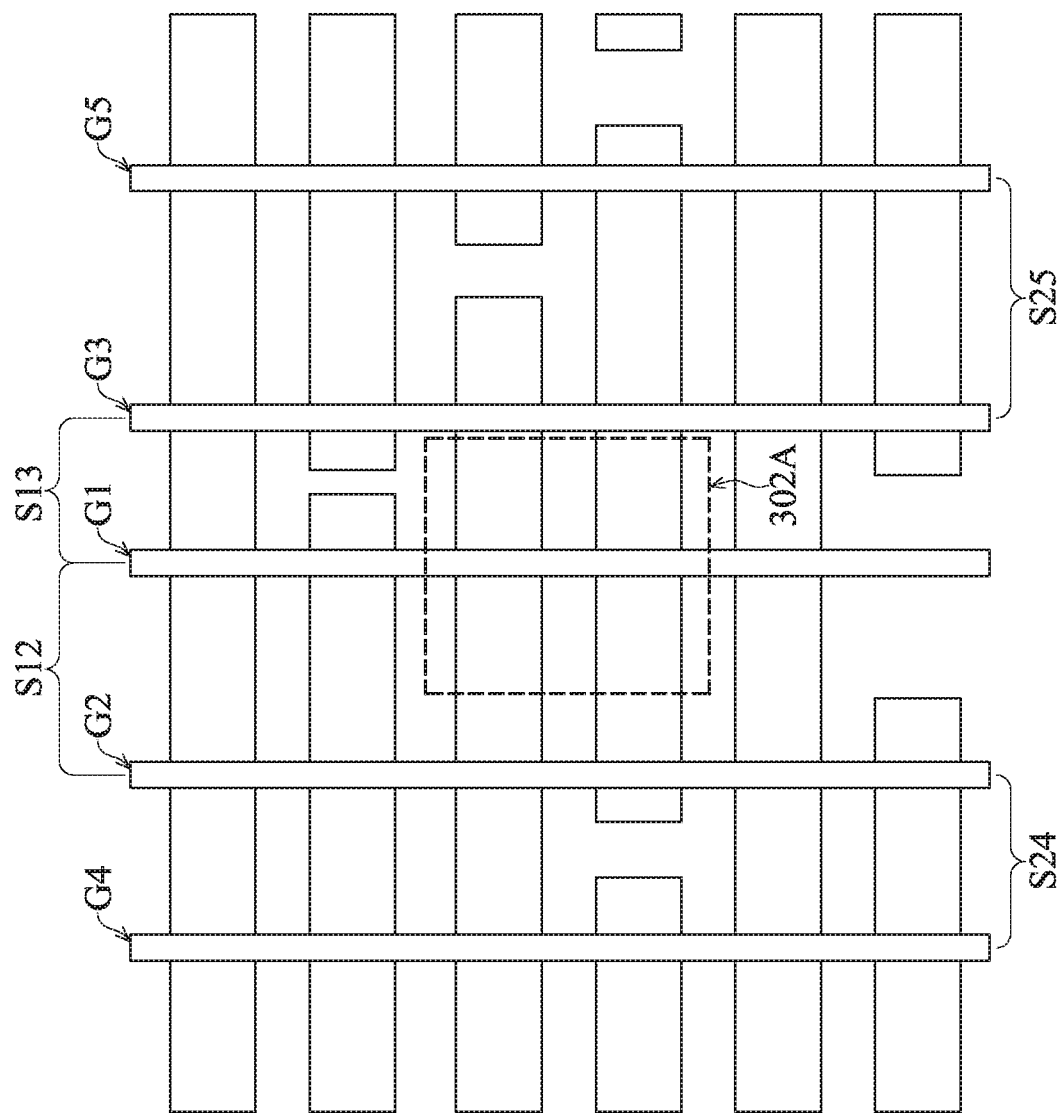

Referring to FIG. 3D, a layout 330 is formed of several cells including the cell 302A located in a center of the layout 330. The configurations of the constituent cells arranged to implement the gate strips and active region strips are similar to those in FIG. 3B and, for simplicity, are not separately illustrated in FIG. 3D. In some embodiments, the dimensions and locations of the gate strips adjacent to the cell 302A, such as gate strips G2, G3, G4 and G5, affect the timing delay characteristics of the cell 302A. For example, spacing values S12 and S13 are included as parameters of the context of the cell 302A, in which the spacing S12 is defined as spacing between the gate strips G1 and G2 while the spacing S13 is defined as spacing between the gate strips G1 and G3. Similarly, spacing values S24 and S35 are included as parameters of the context of the cell 302A, in which the spacing S24 is defined as spacing between the gate strips G2 and G4 and the spacing S35 is defined as spacing between the gate strips G3 and G5.

Figure 3E:
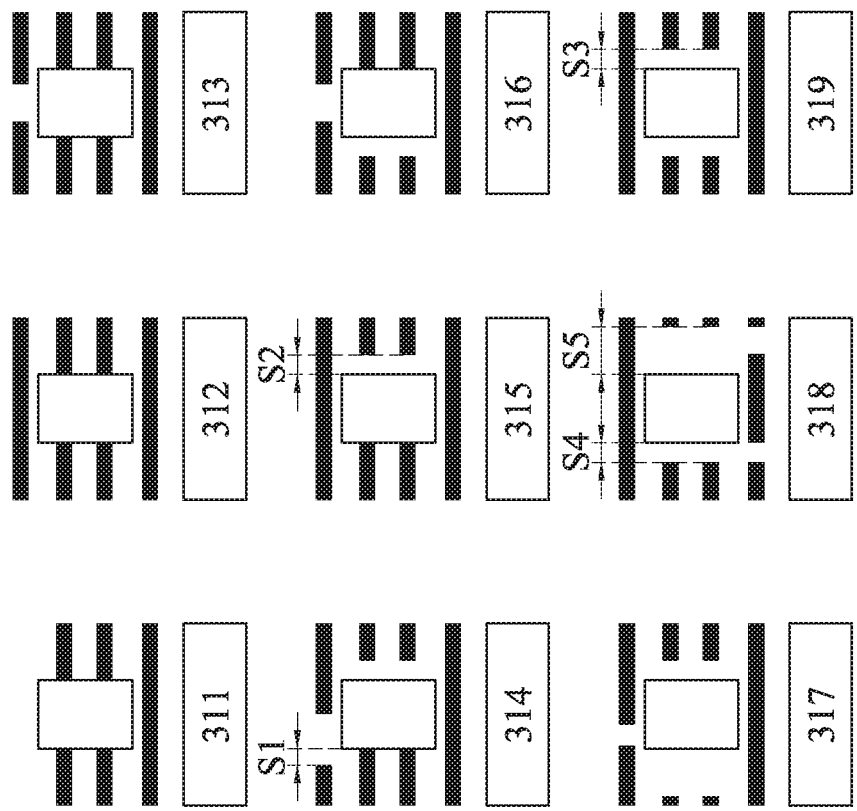

FIG. 3E is a schematic cell matrix 340 having entries of various cell instances with associated cell contexts with respect to the cell 302 of FIG. 3A. Each entry of the cell matrix 340 is represented by a cell context 311 to 319. Only active region strips around the cell 302 are shown in the entries. The configurations of the constituent cells arranged to implement the active region strips are similar to those in FIG. 3B and, for simplicity, are not separately illustrated in FIG. 3E. The layout context in each entry includes the same number of active region strips but includes different contexts. For example, the top active region strip has different configurations: the top active region strip is absent from over the cell 302 in the context 311; the top active region strip extends over the cell 302 in the contexts 313, 314 and 317 with various opening widths and locations; and the top active region strip is continuously over the cells 302 in the contexts 312, 315, 316, 318 and 319. In other scenarios, the two middle active region strips are in direct contact with (or spaced by a distance less than a predetermined value S1 from) the boundary of the cell 302 on both sides in the contexts 311, 312 and 313; the two middle active region strips are spaced apart from (or spaced by a distance equal to or greater than a predetermined value S2 from) the cell 302 on only one side in contexts 314, 315 and 316; and the two middle active region strips are spaced apart from (or spaced by a distance equal to or greater than the predetermined value S2 from) the cell 302 on both sides in contexts 317, 318 and 319. Further, the two middle active region strips are spaced apart from the cell 302 on two sides by substantially equal distances S3 in contexts 319 yet by disparate distances S4 and S5 (where at least one of S4 and S5 is greater than S2 in some embodiments) in contexts 317 and 318. In some embodiments, the conditions of the active region strip are included in the parameters of the context of the cell 302, e.g., whether the active region strip adjacent to the cell 302 contacts the cell 302, or whether the active region strip is spaced apart from the cell 302 on one side or two sides, or the lateral distance between the cell and its nearest active region strip.

Figure 3F:
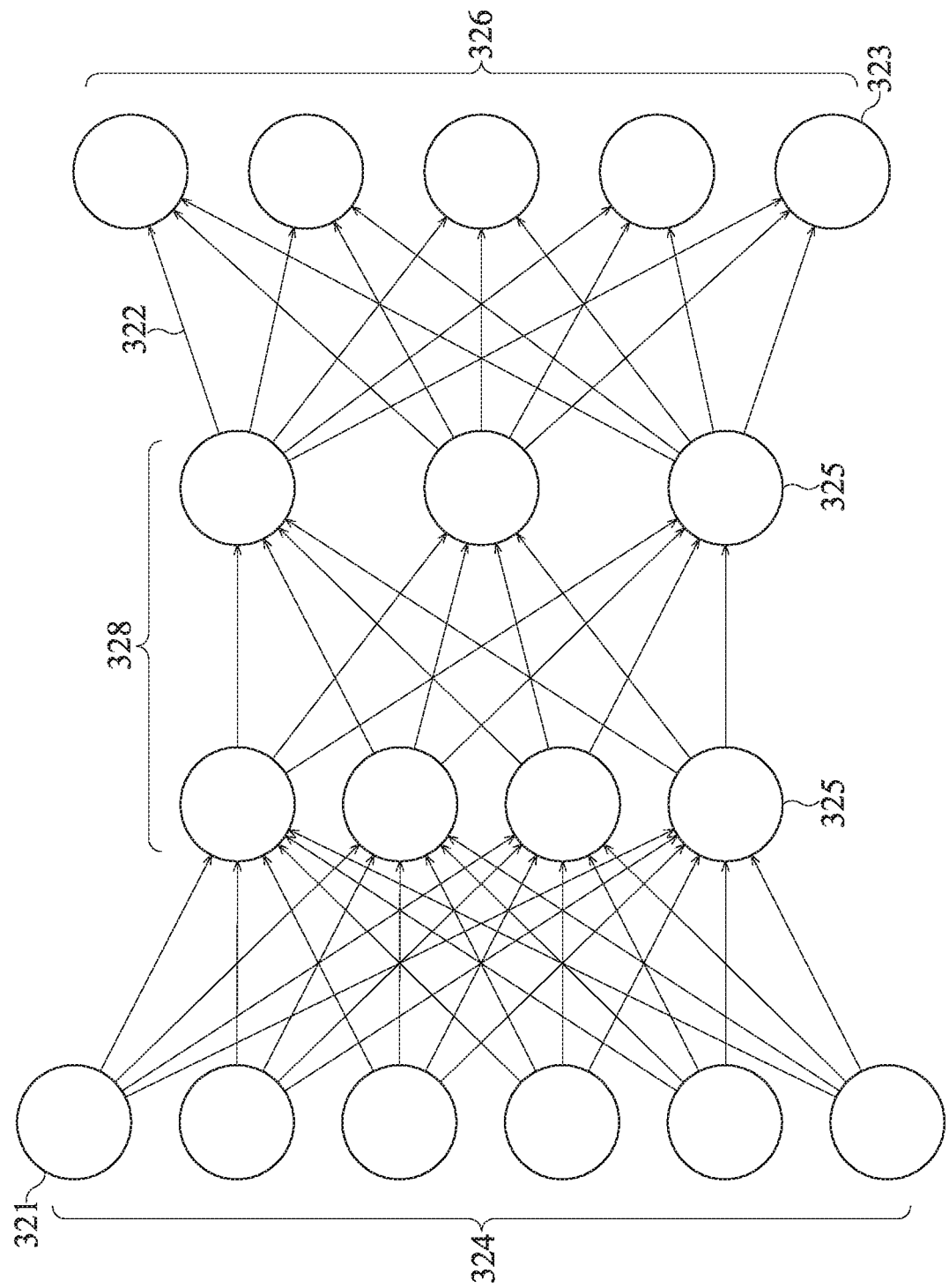
FIG. 3F is a schematic diagram of a training model, in accordance with some embodiments of the present disclosure.

FIG. 3F is a schematic diagram of the training model 204, in accordance with some embodiments of the present disclosure. Referring to FIG. 2 and FIG. 3F, the training model 204 provides a training result of context grouping. The training model 204 has a structure constructed of a plurality of neurons (nodes) 521 interconnected through edges 322. The plurality of nodes may form various layers, e.g., an input layer 324 comprising input nodes 321, an output layer 326 comprising output nodes 323 and one or more hidden layers 328 comprising hidden nodes 325. Parameters of the training model 204 may also be determined, such as the number of nodes in each of the input layer 324, the output layer 326 and the hidden layers 328, and the interconnection topology of the edges 322. In an embodiment, the output layer 326 may include a single output node 323. In the present embodiment, one or more layouts 202 including a multitude of cell instances Ci and the associated contexts is fed into the training model 204 to trigger the machine-learning procedure. In some embodiments, the input nodes 321 receive the parameters of the active region strips of the layout, such as the number of active region strips, the strip configuration index (e.g., indices representing the cases of fully covering the cell, partially covering the cell, absent from the cell, abutting or spaced, and the spaced distances) of each active region strip. In some other embodiments, the input nodes 321 receive the parameters of distances or spacing values with respect to the active region strips or gate strips in FIGS. 3B to 3E, such as the lengths L11, L12, L21 and L22, the distances D1 through D4 and the spacing values S12, S13, S24 and S35. In some embodiments, the output nodes 323 provide the parameters associated with each group. Iterative training procedures for the hidden layers 328 are performed until the values of the hidden nodes 325 attain converged values.

Other types of the training model 204 are also applicable. In some embodiments, a pattern recognition-based training model 204 receives the raw schematic of the two-dimensional layout comprised of polygonal features and is configured to conduct pattern recognition and generate a training result in response to a training condition, e.g., a classification group number, without extracting further parameters. In some embodiments, a bonding zone with a radius or circumference is determined within which the two-dimensional polygons are considered by the training model 204.

Referring back to FIG. 2, upon completion of the training process, the training model 204 provides a set of well-trained model parameters 206 and a group data 208 serving as a result of the context grouping, in which the group data includes a plurality of context groups of the cell Ci, such as Group 1, Group 2, . . . , Group N, in which each context group in the group data 208 comprises classified contexts or circuit topologies. In addition, the context grouping process 200 provides a database 210 including timing tables, such as timing table TT1, timing table TT2, . . . , timing table TTN, corresponding to the context groups in the group data 208. In some embodiments, more than one timing table is provided to correspond to one context group in the group data 208, e.g., each context group is associated with a set of timing tables. In some embodiments, the values of timing delays entered in each timing table are obtained from a timing simulation. In some embodiments, if the distribution of the simulated timing delays of a context group exhibits a smaller deviation (i.e., has values grouped more closely together) as compared to the timing delays of the entire population of cell instances, the training process 200 is considered convergent and successful. The model parameters 206, the group data 208 and the database 210 are to be included in the library 132 in FIG. 1.

In some embodiments, the library 132 includes group identifiers corresponding to the timing tables TT1, TT2 and TTN. In some embodiments, each group identifier is associated with more than one timing table for the context groups. In some embodiments, the group identifier can be accessed by the layout 202 and used to indicate which context group a cell instance in the layout 202 belongs to.

Figure 4A:
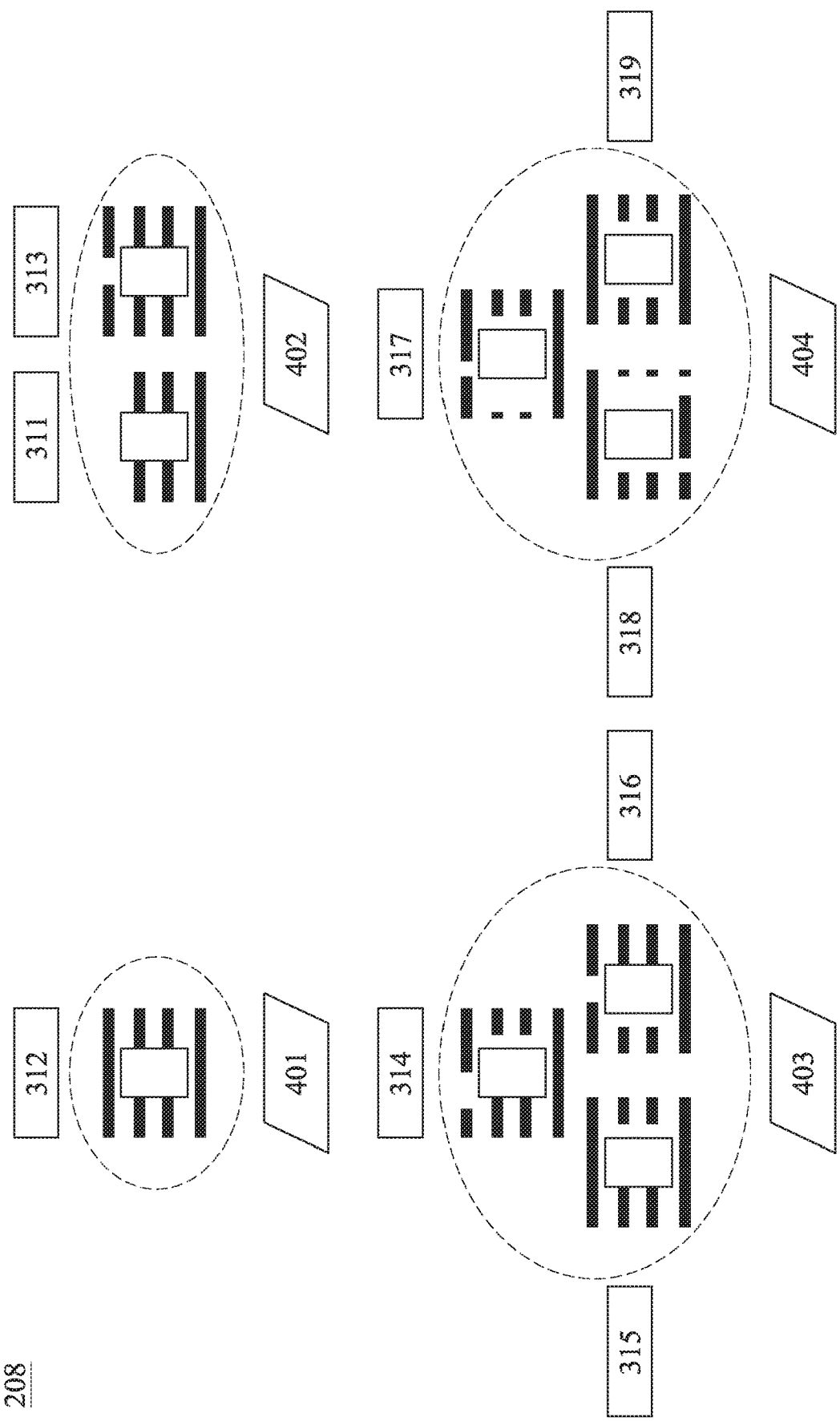
FIG. 4A is a schematic diagram of a result of a context grouping, in accordance with some embodiments of the present disclosure.

FIG. 4A is a schematic diagram of a result of the context grouping, in accordance with some embodiments of the present disclosure. The result is provided by the context grouping process 200 and is represented by the group data 208. In some embodiments, the context grouping is conducted based on the cell matrix 340 collected from the layout 202. In the depicted embodiment, the group number is set at four; however, other values of group number may be applicable dependent upon design requirements. The context grouping operation generates four context groups 401, 402, 403 and 404 represented by the contexts 312; 311 and 313; 314, 315 and 316; and 317, 318 and 319, respectively. In some embodiments, the contexts 311 through 319 are classified into the corresponding groups 401 through 404 by the training model 204 based on a cost function of minimizing the timing delay differences within the groups, and the training model 204 is trained to store the correlation between the cell timing delays and their topologies in the model learning hierarchy, e.g., the weights of the edges 322 in the training model 204 of FIG. 3F.

Figure 4B:
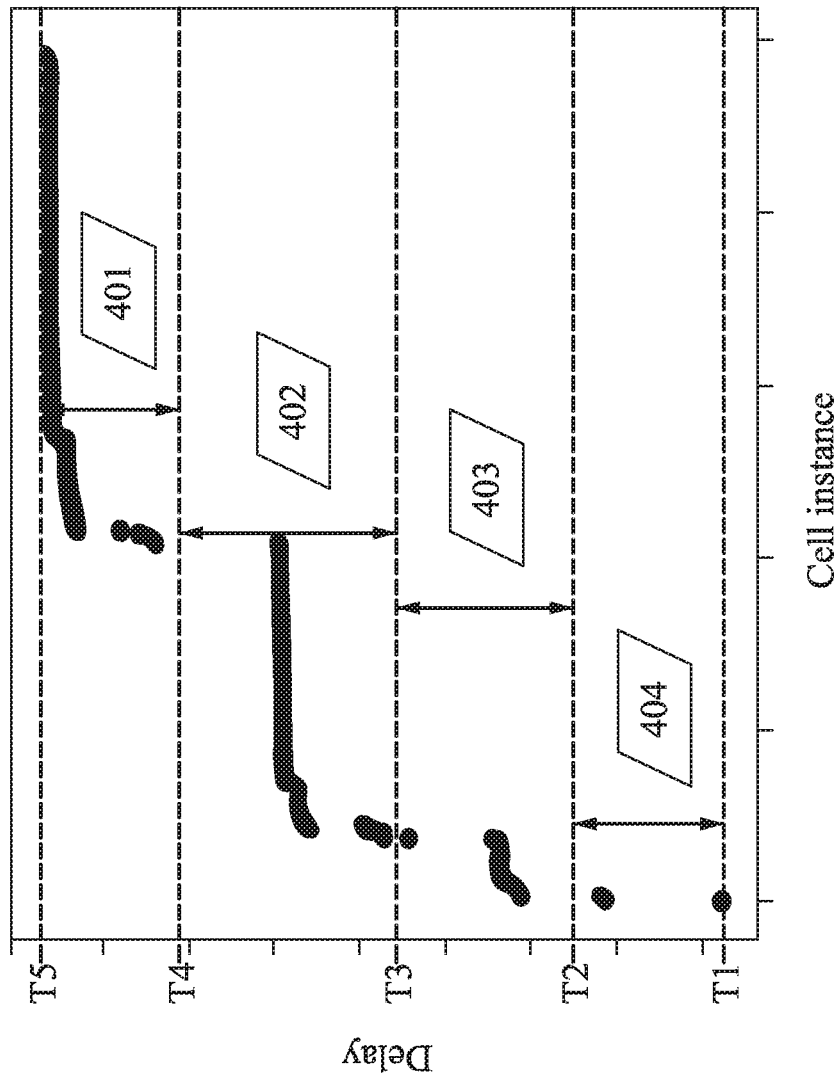
FIG. 4B is a schematic diagram of a chart displaying timing delay distributions of different context groups, in accordance with some embodiments of the present disclosure.

FIG. 4B is a schematic diagram of a chart 400 displaying timing delay distributions of the context groups in FIG. 4A, in accordance with some embodiments of the present disclosure. In an embodiment, a distribution of fall delay values (other types of timing delays also apply but may exhibit different distribution profiles) of the cell 302, obtained by a timing simulation on the database 210, is shown in the order of context group. The X-axis represents a cell instance index and the Y-axis represents the delay values. It can be seen in FIG. 4B that the delay values of each group are concentrated or clustered, and each group is substantially separated from one other. That means the timing delay distributions of a cell can be successfully classified into groups of finer timing delay ranges based on the layout contexts of individual cell instances.

In some embodiments, the timing delays in each context group 401, 402, 403 or 404 are obtained from actual delay values of the cell 302 in one or more layout data that have met the requirements of timing verification. In some embodiments, the timing delays in each context group 401, 402, 403 or 404 are obtained from actual delay values of the cell 302 in a fabricated circuit or are obtained through a simulation for the layout 202. In some embodiments, the timing table for the context group 401, 402, 403 or 404 as derived from the component cells of the respective context group is associated with a group identifier. The group identifier can be used to indicate the context group of a cell instance.

In some embodiments, the simulated delay values of a cell instance in the respective context group are determined as the best-case or worst-case delay values of that context group. For example, the simulated delay value of the cell 302 with respect to the context 312 is determined as the representative delay value in the timing table associated with the context group 401. In some embodiments, the delay values in the timing tables, e.g., TT1 through TTN in FIG. 2, for the corresponding context group in database 210 are determined based on the clustered delay values in the respective context group. For example, a best-case delay value T1, which is around the minimum of the delay values in the context group 404, and a worst-case delay value T2, which is around the maximum of the delay values in the context group 404, are determined as representative delay values in the best-case and worst-case timing tables, respectively, associated with the context group 404. Similarly, a best-case delay value 12 and a worst-case delay value T3 are determined as representative delay values in the best-case and worst-case timing tables, respectively, associated with the context group 403. A best-case delay value T3 and a worst-case delay value T4 are determined as representative delay values in the best-case and worst-case timing tables, respectively, associated with the context group 402. A best-case delay value T4 and a worst-case delay value T5 are determined as representative delay values in the best-case and worst-case timing tables, respectively, associated with the context group 401. In some embodiments, the designation of the worst-case delay value and the best-case delay value of a context group are swapped in different applications. As such, during a timing verification operation for a best-case scenario (or, alternatively, a worst-case scenario), each cell instance is assigned the respective best-case delay values associated with the context group, and the timing analysis is performed based on the assigned delay values of individual cell instances.

In some embodiments, the representative delay value for a context group that includes the best-case scenario and the worst-case scenario is determined based on the delay values of all cells in the respective context group during the context grouping process 200. Taking the context group 401 as an example, the representative delay value corresponding to the context group 401 is obtained as an arithmetic average or a geometric average of the delay values of all the cell instances in the context group 401.

Existing methods of assigning timing tables for a cell usually determine a best-case delay value, e.g., T1, and a worst-case delay value, e.g., T5, as the two representative timing delays in the absence of layout contexts. It is clearly seen that the range between delay values T1 and T5 is larger than the delay value ranges of each of the context groups. However, as discussed previously, a large gap is observed between the actual timing delays and any of the two delay bounding values T1 and T5 for each of the cell instances, since the values T1 and T5 are determined conservatively. The fixed delay values T1 and 15 may not cover the individual delay value adaptively, leading to unnecessary operations of revising the layout 202 or the further steps of engineering change order (ECO) steps. Extra resources of chip area and power, and sacrificed chip performance for such layout revision, will compromise the improvement gained from other endeavors for enhancing the circuit performance. In contrast, the proposed training model 204 can assign tailored timing delays of a cell instance based on a set of timing delay groups by leveraging the layout context around that cell in ta instead of blindly assigning a one-size-fits-all timing table to all cell instances. The timing delay assignment can be conducted successfully with the help of the training model 204 based on the contexts in the timing-verified layouts.

Figure 5A:
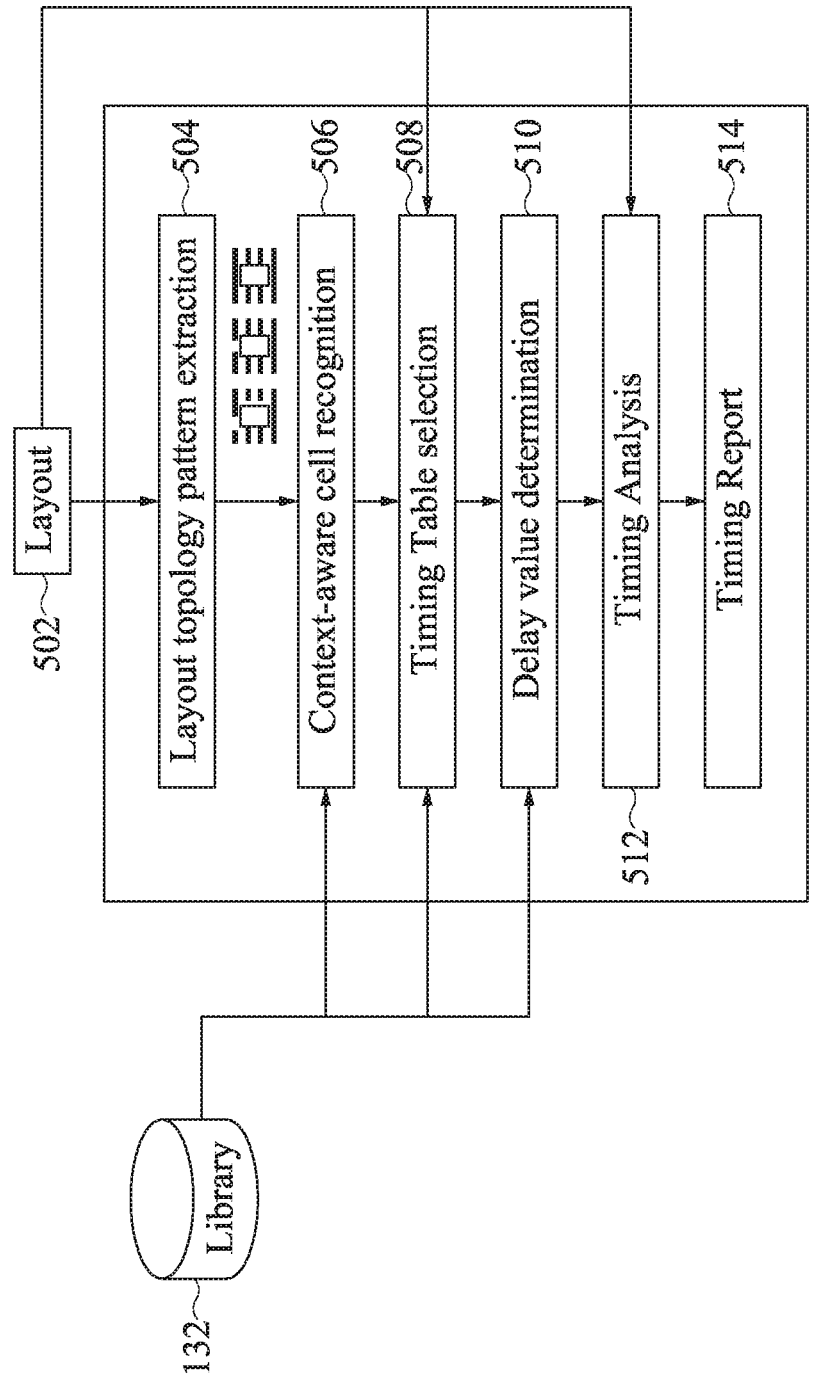
FIG. 5A is a schematic diagram showing a context-aware cell recognition algorithm, in accordance with some embodiments of the present disclosure.

FIG. 5 is a schematic diagram 500 of a context-aware cell recognition algorithm, in accordance with some embodiments of the present disclosure. Initially, a layout is accessed at stage 502. In some embodiments, the layout is an intermediate-state layout formed during the design flow 10, such as a layout at the stage 130, 150 or 160. In some embodiments, the layout is accessed subsequent to a synthesis operation and prior to a placement and routing operation. In some embodiments, the layout under development as provided at stage 502, which has not partly or fully passed the timing analysis, is different from the timing-verified layout 202 provided in the training phase, which has been proven to be compliant with the timing constraint rule. The layout may be constructed of various kinds of cells in which each of the cells may be applied in more than one instance.

At stage 504, a layout topology pattern extraction operation is performed to collect layout contexts of a certain cell. The parameters of the context are provided to a context-aware cell recognition engine at stage 506. In some embodiments, the context-aware cell recognition engine performs cell classification based on an artificial intelligence cell recognition machine, such as convolutional neural network (CNN), recurrent neural network (RNN), autoencoder and the like. In some embodiments, the context-aware cell recognition engine is constructed by LeNet, AlexNet, VGG, GoogLeNet, ResNet, and variants thereof. In some embodiments, the cell recognition machine has a same model type and model structures as those in the training process 200 so that the parameters trained by the training model 204 can be incorporated in the stage 506. In some embodiments, the library 132 in FIG. 1 provides the well-trained parameters required for the context-aware cell recognition engine, such as the model type of the learning machine, and its associated configurations including the number of stages, the number of nodes, and the weights of the interconnecting edges. In some embodiments, the library 132 also provides the number of context groups for the cell recognition and the timing tables for each context group. During operation, the context grouping procedure at stage 506 proceeds until the recognition of all the cell instances with respect to a specific cell type and all of the cell types are completed.

Subsequently, at stage 508, at least one timing table is selected to the cell instance, and is recognized and grouped by the context-aware cell recognition engine at stage 506. At this time, the layout is updated in which each cell instance is determined to associate with the at least one selected timing table. In some embodiments, one context group with more than one timing table is selected for one cell instance. For example, a best-case timing table and a worst-case timing table are selected to be associated with one context group.

In some embodiments, the layout includes or is associated with a map of timing tables. In the map, a timing table is referred to a group identifier. In some embodiments, the layout includes a group identifier which indicates the selected timing table for a cell instance. In some embodiments, a group identifier for a cell instance is referred to by a set of timing tables.

At stage 510, a delay value for the cell instance is determined from the selected timing table. As discussed previously, each cell instance may be assigned a best-case timing table or a worst-case timing table once the context group is selected. In some embodiments, the delay value of a pin in a cell instance is further determined based on the actual parameter values in the layout context. In such circumstance, once it is determined that a cell instance belongs to a certain context group, a timing table is provided which includes an array of delay values.

Figure 5B:
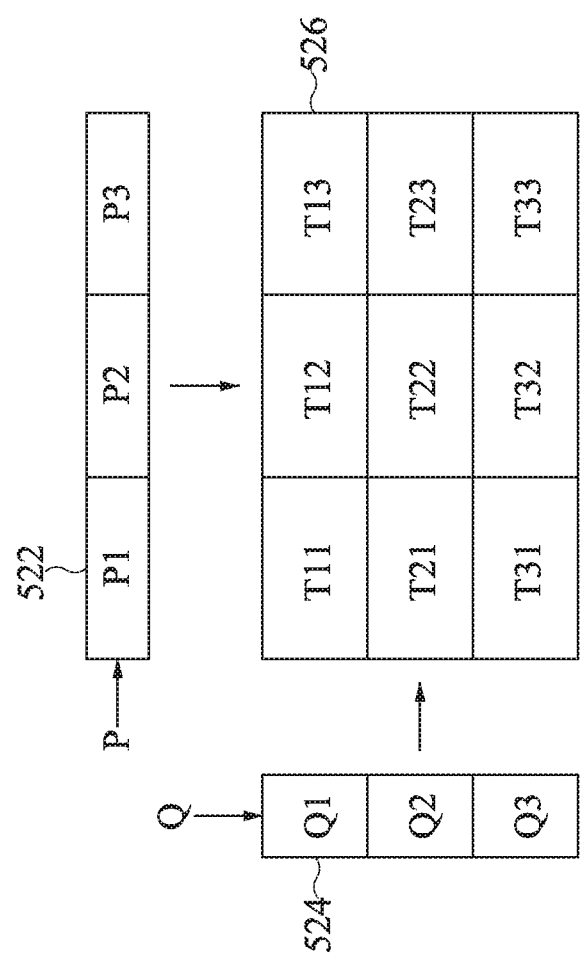
FIG. 5B is a schematic diagram showing a timing table of a context group, in accordance with some embodiments of the present disclosure.

FIG. 5B shows a diagram illustrating the stage 510 in which a delay value is determined by selection from a selected timing table 526, in accordance with some embodiments of the present disclosure. In the depicted example, the timing table 526 may be the timing table TT1, TT2 or TTN in the database 210 obtained through the training process 200. The timing table 526 may represent various types of delays, such as a fall delay, a rise delay, a transition delay, or the like. In some embodiments, a context group may be associated with multiple timing tables 526 with entries of various delay types.

The timing table 526 may correspond to a best-case scenario or a worst-case scenario and include an array of delay values based on various values of table entries. In some embodiments, the table entries are extracted from an electrical network, such as effective capacitance, effective inductance, effective resistance, or combinations thereof coupled to the input/output nodes of the cell instance. In some embodiment, the table entries are obtained through electrical simulations of the cell, such as the slew rate of the input current. In some embodiment, the table entries are obtained from both of the topology of the electrical networks and the simulation of the cell. In some embodiment, the table entries may be provided by the library 132. FIG. 5B shows that timing table 526 is constructed based on a first table entry P with three values P11, P12 and P13, and a second table entry Q with three values Q11, Q12 and Q13. The dimensions of the timing table 526 are determined by the sizes of the table entries P and Q. The table entries P and Q may represent effective capacitance and effective resistance on the input/output nodes of the cell instance. The selection of the delay value from the timing table 526 is conducted based on a combination of the values of the table entries P and Q. For example, if it is determined that a cell instance is coupled to a network formed of a capacitance P1 and a resistance Q2, the representative delay value is selected as the entry T21. In some embodiments, if the actual values for the table entries for the cell are not identical to the context parameter values provided in the timing table 526, the representative delay value is determined by interpolation or extrapolation based on the entries in the timing table 526. As a result, a quantity-based delay value determination for a cell instance on top of the context-aware context grouping further aids the performance of the timing delay characterization.

At stage 512, a timing analysis is performed against the updated layout using a timing analysis engine. During the stage 512, it is determined whether the timing behavior, such as the setup time and hold time, of each timing path complies with the predetermined timing constraint rule. A timing report is provided or generated at stage 514 and includes the results of the timing analysis as to whether the layout complies with the timing verification performed in stage 512.

Figure 6:
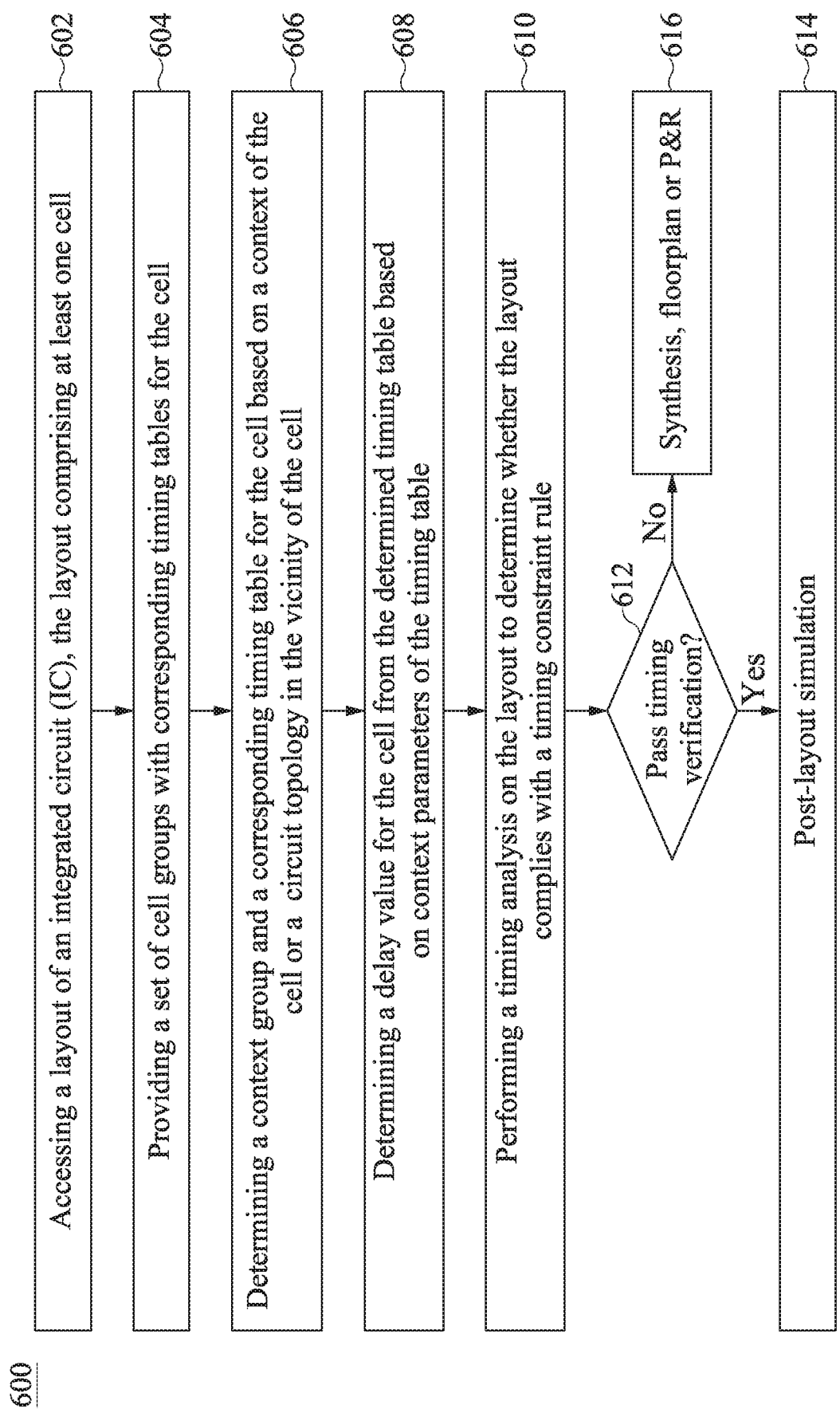
FIG. 6 is a flowchart of a method of a context-aware cell recognition algorithm, in accordance with some embodiments of the present disclosure.

FIG. 6 is a flowchart of a method 600 of a context-aware cell recognition algorithm, in accordance with some embodiments of the present disclosure. At step 602, a layout of an integrated circuit (IC) is accessed. The layout includes at least one cell. At step 604, a set of context groups with corresponding timing tables for the cell are provided. In some embodiments, the context groups and the timing tables are provided through a library. The timing tables of each context group stored in the library may be obtained through a timing simulation on one or more representative cells of the respective group in which layout-dependent effects (i.e., effects caused by the layout context) of the representative cell are considered.

At step 606, a context group and a corresponding timing table are determined (that includes being selected and assigned) for the cell based on a context of the cell or a circuit topology in the vicinity of the cell. The context group is associated with the timing table. In some embodiments, the determined context group is selected from the set of context groups provided by the library. In some embodiments, a group identifier of the timing tables provided by the library and associated with the determined context group is assigned to the cell.

At step 608, a delay value for the cell is determined from the determined timing table based on the timing table entries. In some embodiments, the table entries may include context parameters, such as capacitance, inductance, resistance or other electrical characteristics. In some embodiments, the delay values are selected from a look-up table. The delay values are determined from a plurality of look-up tables (timing tables) given the table entries as inputs.

At step 610, a timing analysis is performed on the layout to determine whether the layout complies with a timing constraint rule. If affirmative, the layout passes the timing verification and the method 600 proceeds with subsequent steps, such as step 614 in which a post-layout simulation is performed. In some embodiments, the step 614 further includes transferring a pattern of the layout to a photomask in response to determining that the layout complies with the timing constraint rule in step 612. In some embodiments, the step further includes fabricating the IC according to the pattern of the photomask.

If it is determined that the layout fails the timing verification, e.g., there exists at least one cell or one timing path that fails to comply with the timing constraint rule, the method 600 proceeds with step 616 and returns to the preceding stages, such as the synthesis stage 130, the floorplan stage, or the placement and routing (P&R) stage 150, for revising the layout.

Figure 7:
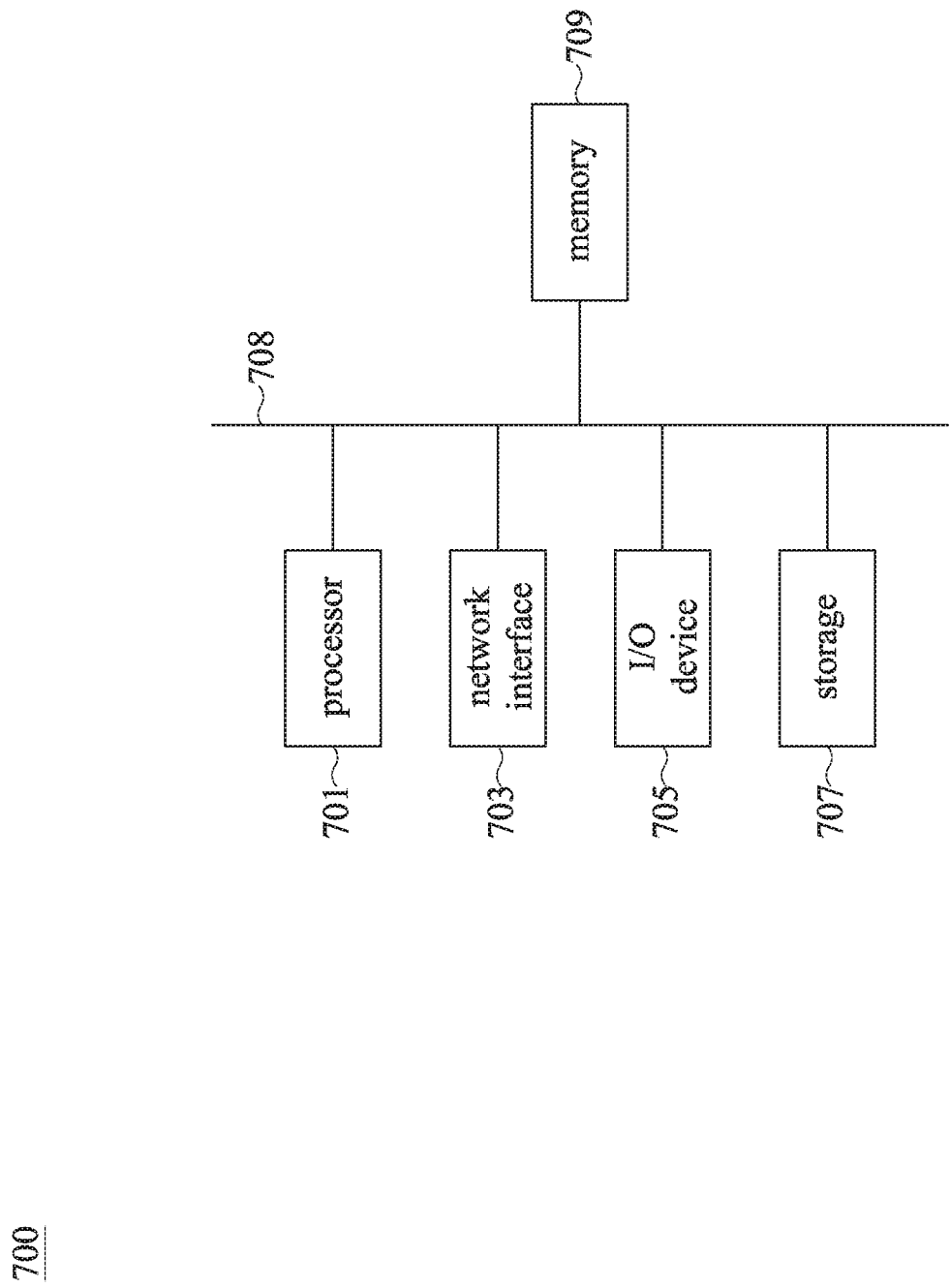
FIG. 7 is a schematic diagram of a system implementing layout design, in accordance with some embodiments.

FIG. 7 is a schematic diagram of a system 700 implementing layout designs, in accordance with some embodiments. The system 700 includes a processor 701, a network interface 703, an input/output (I/O) device 705, a storage 707, a bus 708 and a memory 709. The bus 708 couples the network interface 703, the I/O device 705, the storage 707, the memory 709 and the processor 701 to each other.

The processor 701 is configured to execute program instructions that include a tool configured to perform the method as described and illustrated with reference to figures of the present disclosure. Accordingly, the tool is configured to execute the steps such as: receive design specifications and a library, perform a pre-layout simulation, generate a design data for a layout, perform layout accessing, determine a parameter of timing of the library, perform a model training algorithm, determine a plurality of timing tables, update the library, perform operations of placement and routing, perform LVS, generate a consolidated netlist by incorporating the parameters, perform context grouping tasks and assign a timing table for cell instances in the layout, perform post-layout simulation, and verify the post-layout simulation result.

The network interface 703 is configured to access program instructions and data accessed by the program instructions stored remotely through a network (not shown).

The I/O device 705 includes an input device and an output device configured for enabling user interaction with the system 70. In some embodiments, the input device includes, for example, a keyboard, a mouse and other devices. The output device includes, for example, a display, a printer and other devices.

The storage 707 is configured for storing program instructions and data accessed by the program instructions. In some embodiments, the storage 707 includes a non-transitory computer readable storage medium, for example, a flash memory, a magnetic disk, an optical disk or the like.

The memory 709 is configured to store program instructions to be executed by the processor 701 and data accessed by the program instructions. In some embodiments, the memory 709 includes any combination of a random access memory (RAM), some other volatile storage device, a read only memory (ROM), and some other non-volatile storage device.

In accordance with one embodiment of the present disclosure, a method is performed by at least one processor. A layout of an integrated circuit (IC) is accessed, wherein the layout has at least one cell. A context group for the cell is determined based on a layout context of the cell, wherein the context group is associated with a timing table. A timing analysis is performed on the layout to determine whether the layout complies with a timing constraint rule according to the timing table.

In accordance with another embodiment of the present disclosure, a system includes one or more processors and one or more programs having instructions which, when executed by the one or more processors, cause the system to perform the following steps. A layout of an integrated circuit (IC) is accessed, wherein the layout has a cell. A context group for the cell is determined based on a layout context of the cell, wherein the context group is associated with a timing table. A timing analysis is performed on the layout to determine whether the layout complies with a timing constraint rule according to the timing table.

In accordance with another embodiment of the present disclosure, a non-transitory computer readable storage medium includes instructions which, when executed by a processor, perform the following steps. A layout of an integrated circuit (IC) is accessed, wherein the layout has a cell. A context group for the cell is determined based on a layout context of the cell, wherein the context group is associated with a timing table. A timing analysis is performed on the layout to determine whether the layout complies with a timing constraint rule according to the at least one timing table.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, performed by at least one processor, comprising:
   accessing a layout of an integrated circuit (IC), the layout comprising a cell;
   recognizing a representative context group for the cell from a set of context groups based on a layout context of the cell in the layout, the representative context group being associated with a representative timing table different from timing tables of remaining context groups in the set of context groups; and
   performing a timing analysis on the layout to determine whether the layout complies with a timing constraint rule according to the representative timing table.

2. The method of claim 1, comprising transferring a pattern of the layout to a photomask in response to determining that the layout complies with the timing constraint rule.

3. The method of claim 2, further comprising fabricating the IC according to the pattern of the photomask.

4. The method of claim 1, wherein the layout context is formed of at least one of an active region strip, a gate strip, a dielectric region, a doping region and a conductive region.

5. The method of claim 4, wherein the recognizing of the representative context group for the cell comprises recognizing the representative context group based on whether the active region strip contacts the cell.

6. The method of claim 1, wherein the layout comprises a gate strip in the cell and a well region overlapping the cell, and the representative context group is recognized based on a distance between a boundary side of the well region and the gate strip.

7. The method of claim 6, wherein the layout further comprises an active region strip in the cell, and the representative context group is recognized further based on a distance between a boundary side of the well region and the active region strip.

8. The method of claim 1, wherein the layout comprises a first gate strip, the layout context comprises a second gate strip adjacent to the cell, and the representative context group is recognized based on a distance between the first gate strip and the second gate strip.

9. The method of claim 1, further comprising providing the set of context groups with corresponding timing tables for the cell from a library.

10. The method of claim 9, further comprising performing a training operation on a classification model to provide the set of context groups.

11. The method of claim 10, wherein the training operation is performed based on another layout that passes a timing verification.

12. The method of claim 10, wherein the classification model is characterized by an input layer, an output layer, at least one hidden layer, and weights of edges interconnecting nodes of the input layer, the output layer and the at least one hidden layer.

13. The method of claim 1, wherein the layout comprises an identifier indicating the identity of the recognized representative context group.

14. The method of claim 1, further comprising determining a delay value from the representative timing table for the cell based on context parameters of the representative timing table.

15. The method of claim 1, further comprising performing a placing-and-routing operation on the layout prior to accessing the layout.

16. A system, comprising one or more processors and one or more programs including instructions which, when executed by the one or more processors, cause the system to:
   access a layout of an integrated circuit (IC), the layout comprising a cell;
   recognize a representative context group for the cell from a set of context groups based on a layout context of the cell in the layout, the context group being associated with a representative timing table different from timing tables of remaining context groups in the set of context groups; and
   perform a timing analysis on the layout to determine whether the layout complies with a timing constraint rule according to the representative timing table.

17. The system of claim 16, wherein the instructions which, when executed by the one or more processors, further cause the system to perform a context grouping operation on the cell based on the layout context, a group number of the context groups and a set of timing tables corresponding to the context groups.

18. The system of claim 17, wherein the instructions which, when executed by the one or more processors, further cause the system to perform a training operation to provide the set of timing tables based on the group number and another layout context including the cell.

19. The system of claim 16, wherein the timing analysis is performed subsequent to a synthesis operation and a placement and routing operation.

20. A non-transitory computer readable storage medium, comprising instructions which, when executed by a processor, perform the steps of:
   accessing a layout of an integrated circuit (IC), the layout comprising a cell;
   recognizing a representative context group for the cell from a set of context groups based on a layout context of the cell in the layout, the context group being associated with a representative timing table different from timing tables of remaining context groups in the set of context groups; and performing a timing analysis on the layout to determine whether the layout complies with a timing constraint rule according to the representative timing table.

* * * * *